US012664247B2

(12) United States Patent (10) Patent No.: US 12,664,247 B2
Antonmarco (45) Date of Patent: Jun. 23, 2026

(54) PREDICTIVE SYSTEM OF IDENTIFICATION AND AUTHENTICATION THROUGH IMAGES

(71) Applicant: Catania Antonmarco, Trezzano sul Naviglio (IT)

(72) Inventor: Catania Antonmarco, Trezzano sul Naviglio (IT)

( * ) Notice: Subject to any disclaimer, the term of this patent is extended or adjusted under 35 U.S.C. 154(b) by 56 days.

(21) Appl. No.: 18/715,962

(22) PCT Filed: Dec. 6, 2022

(86) PCT No.: PCT/IB2022/061813
§ 371 (c)(1),
(2) Date: Jun. 3, 2024

(87) PCT Pub. No.: WO2023/105400
PCT Pub. Date: Jun. 15, 2023

(65) Prior Publication Data
US 2025/0036741 A1 Jan. 30, 2025

(30) Foreign Application Priority Data
Dec. 6, 2021 (IT) ........................ 102021000030803

(51) Int. Cl.
*G06F 21/36* (2013.01)
*H04L 9/32* (2006.01)
*H04N 1/00* (2006.01)

(52) U.S. Cl.
CPC ............ *G06F 21/36* (2013.01); *H04L 9/3228* (2013.01); *H04N 1/00334* (2013.01)

(58) Field of Classification Search
CPC ...................................................... G06F 21/36
See application file for complete search history.

(56) References Cited

U.S. PATENT DOCUMENTS

| | | | | |
|---|---|---|---|---|
| 9,628,875 B1 * | 4/2017 | Roth | ................... | H04L 63/0838 |
| 2012/0324242 A1 * | 12/2012 | Kirsch | ................ | G06Q 20/384 |
| | | | | 713/189 |
| 2013/0237155 A1 * | 9/2013 | Kim | ..................... | G06K 7/1447 |
| | | | | 235/375 |
| 2013/0268775 A1 * | 10/2013 | Hawkins | ............... | H04L 9/0872 |
| | | | | 713/189 |
| 2015/0302390 A1 * | 10/2015 | Huxham | .............. | G06Q 20/382 |
| | | | | 705/67 |
| 2019/0149537 A1 * | 5/2019 | Ebrahimi | ................ | H04L 63/08 |
| | | | | 713/171 |
| 2021/0350648 A1 * | 11/2021 | Lodha | .............. | G06Q 20/40145 |
| 2025/0036741 A1 * | 1/2025 | Antonmarco | ........... | G06F 21/36 |

OTHER PUBLICATIONS

Unknown author, "RSA SecurID 800 Authenticator", 2 pages. (Year: 2008).*
Search Report for International Application No. PCT/IB2022/061813 dated Mar. 28, 2023.

* cited by examiner

*Primary Examiner* — Ponnoreay Pich
(74) *Attorney, Agent, or Firm* — Chrisman Gallo Tochtrop LLC

(57) ABSTRACT

A system of identification and univocal authentication of information relating to a sensitive entity consists of the association of a device for generating codes and presenting them through images. An image-reading device provided with communication and transmission means to a different device a code generating and validating device characterized in that: said code generating and validating device through images generates said codes based on univocal information of identification related to an entity, and based on dynamic elements over time; said image-reading device forwards the images to said validation device; said validation device certifies the correctness of said codes received from the image-reading device by comparing them with those generated by itself according to identical methods to those of said device for generating codes.

11 Claims, No Drawings

PREDICTIVE SYSTEM OF IDENTIFICATION AND AUTHENTICATION THROUGH IMAGES

CROSS-REFERENCE TO RELATED APPLICATIONS

This is a National Stage application of PCT international application PCT/IB2022/061813, filed on Dec. 6, 2022, which claims priority from Italian Patent Application No. 102021000030803, filed on Dec. 6, 2021, both which are incorporated herein by reference in their entirety.

TECHNICAL FIELD

The present invention relates to a system of identification and univocal authentication of an entity by means of tools for predictive coding through images.

TECHNICAL BACKGROUND

In order to solve various needs, systems have long been structured in order to codify objects or people through images that need to be univocally and quickly classified and identified by supervisors. For example, the development of the computer technology, people have witnessed the birth and rapid development of information coding by means of barcodes, i.e., the coding of a sequence of parallel bars containing all data of interest according to a binary logic. Associated with the bar coding, a numerical coding system is provided as well, aimed at facilitating a successful reading of the information in the event of malfunction, or absence, of a specific reader.

Such system, which is still in use, made inventory management operations much easier compared to the systems exclusively based on human expertise, but it clearly presented some drawbacks since the beginning.

First of all, the so structured system allows to manage only concise and reduced information, due to insurmountable mathematical limitations, requiring in most cases a connection to a remote data processing and visualization system, which entails important and expensive security issues.

Secondarily, it is easy to repeat such a code: in fact, this probably is the main purpose for its genesis, considering that the typical development was achieved in the field of products for the consumers.

The need for a concise and secure coding system comprising a larger amount of information led to the development of the so-called QR code, a system for coding the information based on transforming data into a combination of empty and full spaces within a square frame. Such encoding makes it possible to absorb a larger amount of data and reduces the need for connections to external data storage systems, because in a so constructed image a very large amount of data can be embedded. Obviously, it is also possible to provide for such data to exclusively be the connection to an external website, or also for the reported data to be validated by external entities via a remote server, consequently requiring an external connection.

Compared to the properties of the information collection embedded in a barcode, therefore, the amount of available data in the image is considerably increased, without requiring a wider space to be reproduced on the surfaces it is applied to.

The QR code system, which has proven to be particularly useful and which has been quickly considered as an effective tool for defining the identity identification of people, vehicles, and any type of objects, has certainly solved many issues entailed by the production (and storage) of paper documents, thus providing considerable support on the side of security as well.

Systems created to process user authentication via telematic connection have also been developed. US 2019/149537, for example, identifies the QR code system per se as a system for user identification when accessing a user page managed in blockchain mode.

However, the use of a QR code currently presents two big security issues. In order to explain, the system can be easily duplicated: a QR code, just like a barcode, is sequentially reproduced on a product packaging, and—for more sensitive applications—also transmitted to interested third parties by means of photostatic copying or even just photographic reproduction. Furthermore, it is possible to "construct" non-authentic QR codes, without much difficulty, if the generation keys of such type of code are obtained. These are undoubtedly illegal operations, which nevertheless make it urgent to implement and actuate solutions that make essentially impossible the authentication by competent bodies in case of validations of non-authentic QR.

OBJECTS OF THE INVENTION

There is therefore a strong need for a secure and univocal user identification process through identification patterns which provide a reply in real-time, that is validated, and that could be tracked.

Object of the present invention is therefore to create a system of identification and univocal authentication of information relating to a sensitive entity, such as a person, an animal, or an object, which allows both to retrieve basic information of said entity and to guarantee in real time the actual validity and univocalness of said entity according to necessity, through commonly used and easily accessible devices.

This system consists of the association of a device for generating codes and presenting them through images.

image-reading device provided with communication and transmission means to a different device a code generating and validating device characterized in that:

said code generating and validating device through images generates said codes based on univocal information of identification related to an entity, and based on dynamic elements over time;

said image-reading device forwards the images to said validation device;

said validation device certifies the correctness of said codes received from the image-reading device by comparing them with those generated by itself according to identical methods to those of said device for generating codes.

Other advantageous features and properties will become clear from the following description made with reference to two specific preferred embodiments.

The system according to a first preferred embodiment of the invention basically consists of a mobile communication device, such as a smartphone or a tablet, internally provided with a device for generating codes based on the reception and transformation of univocal information into images. Said codes receipt predefined univocal information and convert them into a image which can be recorded and/or shown on a screen, according to a specific predefined algorithm.

The device for generating codes is therefore substantially a data processing application apt to emit a coded image, i.e., a QR code, based on public elements and on a private coding key. In this way the device can generate one or more univocal QR codes.

The so produced image and displayed on the screen is recognized and read by an image-reading and transmitting device. Once identified the request of submission, the image-reading and transmitting device sends the data in turn to a code generating and validating device consisting of a server internally provided with a application apt to create codes.

The application provided in the code generating and validating device has got an identical methodology to the one provided in the device for generating codes and presenting them through images, in order to accomplish a secure and complete comparison of the data coming from the mobile telephone with those coming from the machine itself. Once the comparison is complete, the device which receipts and compares the information embedded in the QR code outputs an admittance signal.

In a second embodiment, the system can be simplified by reducing the number of devices: the device for generating codes and presenting them through images is integrated inside the image-reading device provided with communication and transmission means. In this case, once the code is generated, the device sends the image data to a server, so that the same can proceed with the receipt and comparison of information.

In operation, the following procedure may be followed, by way of example.

On his first access with a specific device, the user has to sign up in order to identify, by providing the conventional personal information which guarantee a first correct identification. To complete the registration, the user requests an activation code from the certification entity which remotely manages the apps and validates the QR codes. After such a request, the certification entity issues a numerical identification code and sends it to the user by e-mail or SMS, taking the usual precautions which guarantee univocalness of the receiver and impossibility of cloning, in order to obtain the safety of the identification system.

As an example, it is currently provided the set-up of an eight-digit numerical identification code, but different solutions of greater safety are not excluded: in order to avoid the user having problems to remember a tricky identification code not chosen by themselves, the system outputs a temporary, time-limited code.

Once received the code, the user enters a reserved area provided within the server—or validation device—wherein they have to enter the personal data, so that the certification entity can univocally recognize them in any subsequent identification activity, eventually also for legal identification.

During the data transmission, the code generating device enters the data related used communication device together with the data package transmitted to the validation device, automatically or manually inserted by the user; in such a way also said communication device is part of the identification and authentication system, allowing the server to recognize the consistency of the device and the data referring to the same. As a matter of fact, these data are immutable and univocal data, and they cannot be counterfeited, being automatically concerted between the user-side and platform-side application. Once all the information required to define the actual personal data of the user are obtained, the certification entity outputs a code containing the information needed to establish a connection between the user and the certification entity. The user can present the aforementioned code, using a QR code image to the image-reading and transmitting device which sends it to the server—or code generating and validating device—for subsequent identification, authentication, and validation. Since authentication via QR code or via a generic static image is possible but not secure, an additional safety level is required. Therefore, a function is provided in the code generating device, according to which a sequence of codes presented as images of, e.g., QR codes, is generated at programmable time intervals, that displayed on a screen and that can be read by the image-reading and transmitting device; in such a manner, the code generating and validating device can recognize and validate them.

It could be appreciated that these time intervals are very short in time in order to avoid the duplication for fraudulent authentication. Each of the so generated images or QR codes, that cannot be recognised in fact by the user or by third parties, can be private QR codes, or PQRcodes. A possible algorithm for generating individual images is, for example:

$$P-QRCode(Tx) = F(FixQRcode, IMEI, Tx)$$

wherein

IMEI is the univocal identification code of the device for generating codes and presenting them through images, and Tx is a variable which takes into account information which are independent of user-entered information but identify the device and/or the instant of activation of the authentication and validation system, such as for example the absolute time.

Due to the private information stored in the registration phase, the validation system, that includes the expected time interval between the images in a PQRcode sequence, is capable of calculating the user identification code and therefore authenticating him through an algorithm like:

$$FixQRCode = F'(P-QRCode(TX), IMEI, Tx)$$

More generally, when it is required or appropriate the activation of authentication, the user interrogates the system through the application and his own QR code, activating the connection. Once the connection is open, the user application generates a sequence of private or dynamic QR codes at a predefined time interval concerted with the authentication server, i.e. QR codes which partly contain the static QR code information and information that are univocal and that cannot be counterfeited according to the scheme concerted in the phase of service activation, depending on the security level set by the user.

The certification entity originally defines the properties of the sequence of QR codes (time interval between QR codes and requested number of QR codes) for example modifying the duration of an image presentation depending on the aimed security level.

Once the certification entity acknowledges the identity accuracy, it grants authentication and sends an authentication signal, for example by means of a single confirmation message or by opening an electromechanical, electromagnetic, or other device.

Finally, it should be pointed out that the operability of the system created in such a manner does not necessarily require a constant connection to the telecommunications network. It is sufficient that authentication takes place after both devices—the device for generating codes and the image-reading device—have recently connected to the internet, and the image-reading device consequently possesses the necessary information to recognize the code generated by the device for generating codes: in this way, the rule is indeed already memorized in the system, and communication between the two devices can therefore occur in any case. Such a arrangement guarantees the off-line functioning of the system, allowing a successful identification of the identity of the user to be authenticated, under all network conditions, and a correct functioning of the device downstream of the identification system.

The above description involves some fundamental assumptions, namely that the mobile telephone communication device is considered as a personal object which requires the common diligence of a careful person, containing a significant amount of sensitive information that normally urge the rightful owner to file immediate notification to public security officers and to block the identity in case of loss or theft. It is therefore evident that all the security specifications described above could theoretically fail in the event of any failure to timely report the loss of the device, and with its use by unauthorized third parties.

As a person of ordinary skill in the art can easily understand, a telephone or tablet is a perfect apparatus, being expressly proprietary, linked to a specific person, in some cases also geo-tracked, and in any case easy to disable. These features guarantee a very high margin of safety, and a virtually certain identification of the person of reference.

As highlighted for the second embodiment of the present system, it is possible to assume that the image generation device and the image-reading and transmitting device are here in a single unit, eliminating an interface and control unit: although this arrangement could limit the safety of the system, it would be a possible and useful solution in particular cases, e.g., if safety is a relatively limited requirement, or if there are no technical spaces to set up an external structure for reading and transmitting the image.

It could be certainly understood that any other device—even suitably created—having the technical features indicated above, such as to be a founding part of the system described above, can be considered as a useful apparatus for a correct functioning of the novel solution herein described.

In the example presented so far, express reference has been made to the management of a QR code. However, it is perfectly understood that multidimensional images of any type are possible, for example according to logic of representation according to fractals, which would exponentially increase the probabilities of obtaining a substantially infinite combination of sequences, resulting in a substantial impossibility of identifying the calculation codes, unless you are the programmers themselves.

Similarly, it can be provided that the same identification code is a simplified code, such solution essentially aiming at establishing a connection between the user and the authentication system, and guaranteeing the univocalness of the connection, reducing the risk of fraudulent otherwise. Furthermore, in order to increase the security of the originally described authentication system, some tools for a more secure user identification can be provided, both in the first access phase and in the operative phase. In particular, it may be required, for the communication between the device and the control system to not be deactivated, that the device is located at a shorter distance from the control system than a radius of defined length, considered admissible so that the request is not deemed fraudulent. To this end, and also in order to increase safety level (because, for example, some areas are considered to be at risk), it is possible to include-among the authentication information automatically retrieved from the terminal—the definition of the device GPS coordinates at the time of authentication.

The invention claimed is:

1. A system for uniquely identifying and authenticating information relating to a sensitive entity, comprising:

a first device for generating codes via a code generation method and presenting the generated codes through images, an image-reading device provided with communication and transmission means to a different device, a second device for validating codes presented with images and capable of applying the same code generation method as the first device, wherein the second device generates additional codes to be compared with codes received from the first device and verifies that the compared codes are identical, Characterized in that:

said first device and said second device each generate their respective codes based on unique identifying information relating to an entity and elements that change over time;

said image-reading device forwards the images generated by the first device to the second device;

said second device certifies the correctness of said codes received from the image reading device by comparing said received codes with the additional codes generated by the second device using methods identical to those used by said first device, wherein the second device is configured to generate the additional codes when offline and without the need for an internet connection; and a sequence of images is emitted by the image-reading device in a predetermined number and in a temporal sequence depending on the security level set by the user.

2. The system for uniquely identifying and authenticating information relating to a sensitive entity according to claim 1, characterized in that said images generated by the first device are dynamic and contain one or more of the following information:

static authentication data of the user, the provider, and the request, data derived from a unique code registered on the device, which characterizes the user's device, non-programmable, time-varying data, used in combination with other data to generate codes to be presented and read via images.

3. The system for uniquely identifying and authenticating information relating to a sensitive entity according to claim 2, characterised in that said non- programmable, time-varying data, automatically emitted by said code generation device, is absolute time.

4. The system for uniquely identifying and authenticating information relating to a sensitive entity according to claim 3, characterized in that said dynamic images are multidimensional and generated using the function $$P\text{-}QRCode(Tx) = F(FixQRcode, IMEI, Tx)$$

and in that said validation device authenticates the sequence of images received and confirms the user's identity using the function $$FixQRCode = F'\big(P\text{-}QRCode(TX), IMEI, Tx\big)$$

where

FixQRCode includes the static authentication data of the user, the provider, and the request, P-QRCode(Tx) is the code dynamically generated at time Tx, which is then represented via a QR Code, IMEI is the unique device identification code for generating codes and presenting them via images or a secret software key stored on the device to identify it, and Tx is a variable that takes into account information independent of the information entered by the user.

5. The system for uniquely identifying and authenticating information relating to a sensitive entity according to claim 2, characterized in that said information incorporated in said dynamic images also includes a distance of said first device coming from a control system, and/or its GPS coordinates at the time of authentication.

6. The system for uniquely identifying and authenticating information relating to a sensitive entity according to claim 5, characterized in that said control system cuts off communication upon receiving different information about distance and/or position from predefined values.

7. The system for uniquely identifying and authenticating information relating to a sensitive entity according to claim 1, characterized in that said first device comprises a mobile telephone communication device issuing an image onto a screen.

8. The system for uniquely identifying and authenticating information relating to a sensitive entity according to claim 7, characterized in that said image- reading device is placed inside said mobile communication device.

9. The system for uniquely identifying and authenticating information relating to a sensitive entity according to claim 1, characterized in that said second device outputs an authentication signal upon successful authentication of the user.

10. The system for uniquely identifying and authenticating information relating to a sensitive entity according to claim 9, characterized in that said authentication signal activates one of an identity confirmation warning control, an electromechanical or electromagnetic device, or other control device.

11. The system for uniquely identifying and authenticating information relating to a sensitive entity according to claim 1, characterized in that said first device and said image-reading device, each stores respective univocal data at the moment of first communication in order to allow identification of the other device under any condition of the telecommunication network.

* * * * *